United States Patent [19]

Lewis

[11] Patent Number: 4,819,362

[45] Date of Patent: Apr. 11, 1989

[54] FISHING LURE AND BLADE THEREFOR

[76] Inventor: Millard C. Lewis, 641 Alabama Ave., Sellersburg, Ind. 47172

[21] Appl. No.: 146,198

[22] Filed: Jan. 20, 1988

[51] Int. Cl.⁴ ............................................. A01K 85/00
[52] U.S. Cl. ..................................... 43/42.2; 43/42.51
[58] Field of Search .................. 43/42.2, 42.19, 42.14, 43/42.13, 42.46, 42.17, 42.51, 42.12, 42.16

[56] References Cited

U.S. PATENT DOCUMENTS

| | | | |
|---|---|---|---|
| D. 24,724 | 10/1895 | Pealer | 43/42.51 |
| 614,411 | 11/1898 | Rockwood | 43/42.2 |
| 646,916 | 4/1900 | Pflunger | 43/42.2 |
| 1,836,650 | 12/1931 | Davenport | 43/42.19 |
| 2,549,354 | 4/1951 | Wilson | 43/42.17 |
| 3,432,957 | 3/1969 | Marino | 43/42.2 |

Primary Examiner—Kurt Rowan

Attorney, Agent, or Firm—Jon C. Winger

[57] ABSTRACT

A fishing lure has two identically configured and sized blades disposed in a mirror imaged, overlaying spaced apart relationship to each other and mounted at a common axis for swivel movement about the common axis. Each of the blades is asymmetrically configured and includes a planar central body generally triangular in peripheral configuration having two side edges diverging from the apex at the front end of the blade, a first impeller projecting outwardly from one planar surface of the planar central body proximate one base corner of the central body and a second impeller projecting outwardly from the other planar surface of the planar body proximate the other base corner of the central body. The second impeller is offset from the first impeller in the longitudinal direction of the swivel axis.

2 Claims, 2 Drawing Sheets

FISHING LURE AND BLADE THEREFOR

BACKGROUND OF THE INVENTION

The present invention relates to fishing lures, and more particularly to spinner or spoon type fishing lures which make a noise and disturb the water as they are moved on the surface of the water by the fisherman.

Various fishing lures of this type are known. The following U.S. patents show examples of side lures. U.S. Pat. No. 24,724 issued on Oct. 1, 1895 to E. O. Pealer shows a single spoon bait of two arcuate wings of unequal length. U.S. Pat. No. 295,350 issued on Mar. 18, 1884 to W. D. Chapman shows an artificial trolling bait having curved plates of gradually increasing width toward their lower ends with notches along their outer edges. The curved plates are attached to a central tube which receives a wire which is attached to a fishing line. U.S. Pat. No. 871,057 issued on Nov. 12, 1907 to W. E. Davis shows a fishing lure having a main body resembling a small fish with a pair of small spinners rotatably mounted to the main body to either side thereof near the front end of the main body and a spoon rotatably mounted at the tail end of the main body. U.S. Pat. No. 2,238,292 issued on Apr. 15, 1941 to E. C. Schavey shows a fishing lure having a spoon shaped main body and a propeller spinner rotatably attached to the front end of the spoon by a shaft. U.S. Pat. No. 2,588,300 issued Mar. 4, 1952 to C. O. Smith shows a fish lure of four fish shaped tabs or fins disposed at ninety degrees to each. The lure is attached by a swivel joint to a fishing line. U.S. Pat. No. 4,416,080 issued on Nov. 22, 1983 to L. E. Morrissette shows a fish lure having a tapered fluted main body having a hook at the rear end and a swivel joint at the front end to be attached to a fishing line.

SUMMARY OF THE INVENTION

The present invention provides a blade for a fishing lure having a generally planar central body generally triangular in peripheral configuration having two side edges diverging rearwardly of the central body from the apex at the front end of the blade, swivel mounting means defining a swivel axis of the blade bisecting the apex angle and extending along the length of the central body from the apex to the rear end of the blade, a first impeller projecting outwardly from one planar surface of the central body proximate one base corner of the triangular central body, a second impeller projecting outwardly from the other planar surface of the central body proximate the other base corner of the triangular central body, the second impeller being offset from the first impeller in the longitudinal direction of the swivel axis.

The present invention further provides a fish lure comprising: a first spinner comprising a generally planar central body generally triangular in peripheral configuration having a first side edge and second side edge diverging in a rearward direction of the central body from the apex at the front end of the central body, swivel mounting means defining a swivel axis of the blade bisecting the apex angle and extending along the length of the central body from the apex at the front end of the blade to the rear end of the blade, a first impeller blade projecting outwardly from one planar surface of the central body at the rear end of the triangular central body proximate one base corner of the triangular central body, a second impeller projecting outwardly from the other planar surface of the central body at the rear end of the triangular central body proximate the other base corner of the triangular central body and, the second impeller is offset from the first impeller in the longitudinal direction of the swivel axis, a second comprising a generally planar central body generally triangular in peripheral configuration having a first side edge and a second side edge diverging in a rearward direction of the central body from the apex at the front end of the central body, swivel mounting means defining a swivel axis of the blade bisecting the apex angle and extending along the length of the central body from the apex at the front end of the spinner to the rear end of the blade, a first impeller projecting outwardly from one planar surface of the central body at the rear end of the triangular central body proximate one base corner of the triangular central body, a second impeller projecting outwardly from the other planar surface of the central body at the rear end of the triangular central body proximate the other base corner of the triangular central body and the second impeller is offset from the first impeller in the longitudinal direction of the swivel axis, the first and second blades are disposed in mutual overlaying, spaced apart, mirror image relationship with their swivel axis coinciding such that first impeller of the first blade and second impeller of the second blade are in mutual overlaying relationship, and the second impeller of the first blade and first impeller of the second blade are in mutual overlaying relationship and a common swivel axis interconnecting the swivel mounting means of the first blade and swivel mounting means of the second blade such that the first and second blades are free to swivel about the swivel axis.

BRIEF DESCRIPTION OF THE DRAWINGS

A better understanding of the present invention will be had upon reference to the following description in conjunction with the accompanying drawings wherein like numerals refer to like parts and in which.

DETAILED DESCRIPTION OF THE PREFERRED EMBODIMENT

With reference to FIGS. 1-4, there is shown a blade, generally denoted as the numeral 10, for a fish lure, generally denoted as the numeral 12, shown in FIGS. 5-9.

Figure 1:
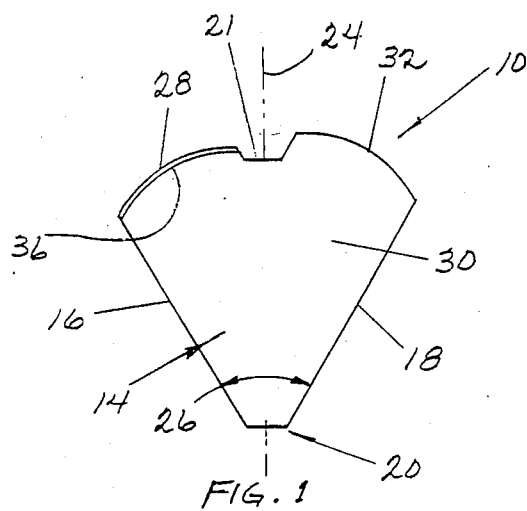
FIG. 1 is a top view of the blade of the present invention.
Figure 2:
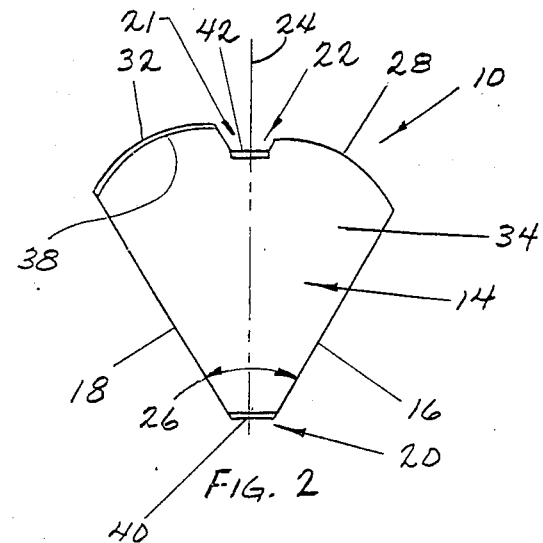
FIG. 2 is a bottom view of the blade of FIG. 1.
Figure 3:
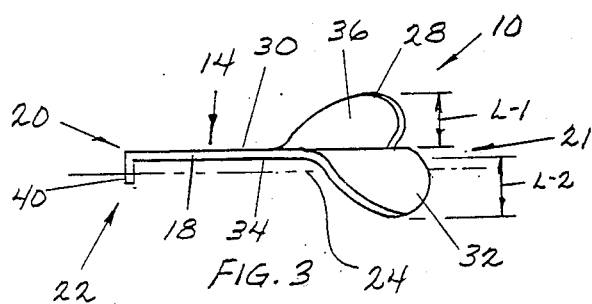
FIG. 3 is a side view of the blade of FIG. 1.
Figure 4:
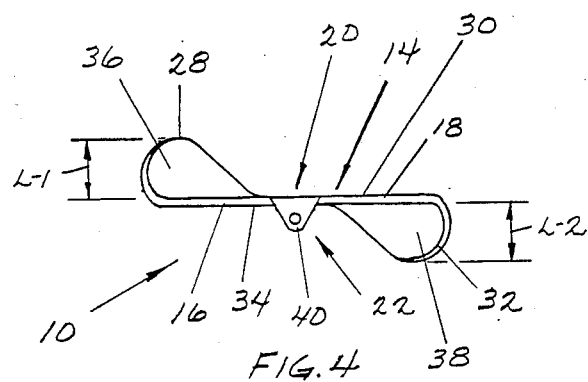
FIG. 4 is a front view of the blade of FIG. 1.
Figure 6:
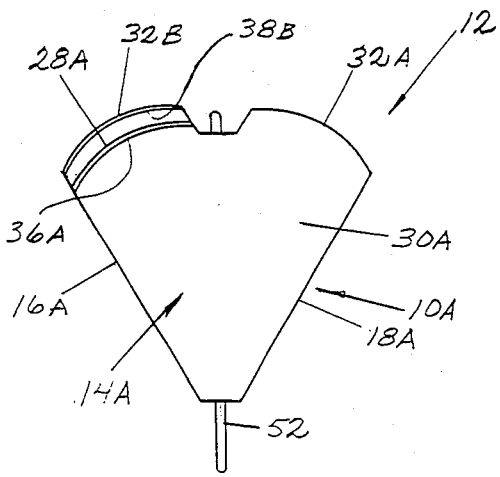
FIG. 6 is a top view of a fish lure of the present invention.
Figure 7:
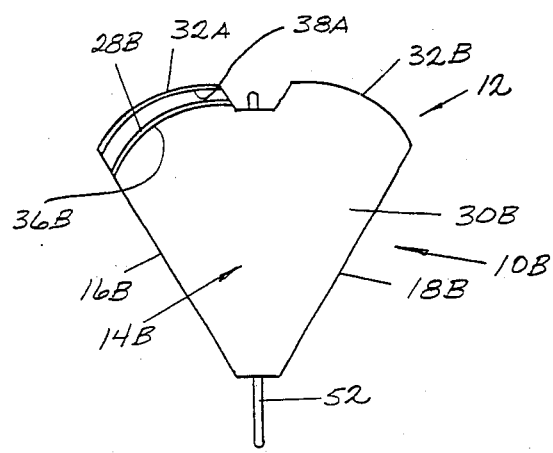
FIG. 7 is a bottom view of the fish lure of FIG. 6.
Figure 8:
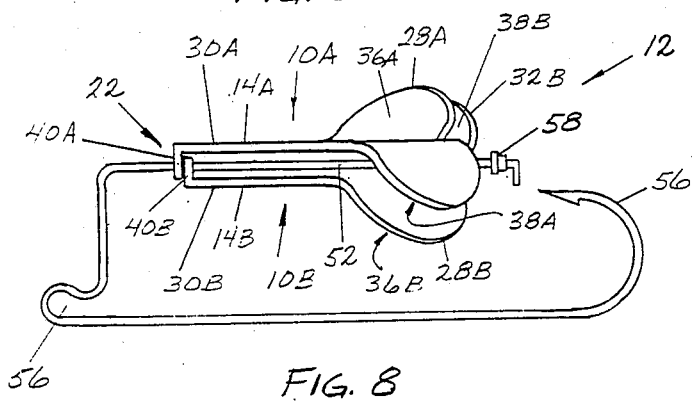
FIG. 8 is a side view of the fish lure of FIG. 6.
Figure 10:
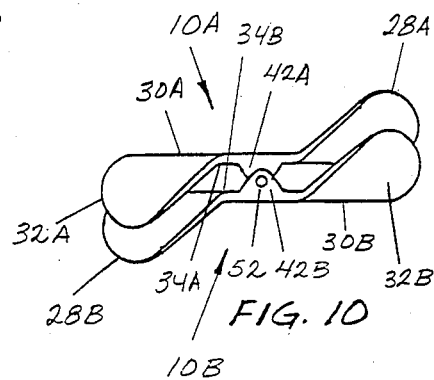
FIG. 10 is a rear view of the fish lure of FIG. 6.
Figure 9:
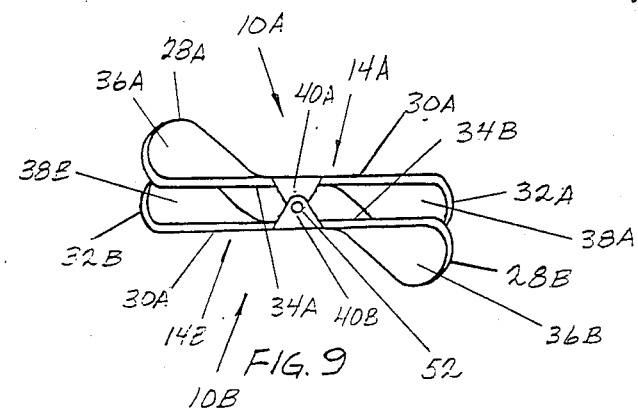
FIG. 9 is a front view of the fish lure of FIG. 6.

As can be best seen in FIGS. 1-4, the blade 10 comprises a substantially planar central body 14 generally triangular in peripheral configuration. The blade 10 has two side edges 16 and 18 diverging from the apex 20 of the triangular central body 14 at the front end of the blade 10 in a direction toward the rear end 21 of the blade 10. Swivel mounting means, generally denoted as the numeral 22, defines a swivel axis 24 of the blade 10 bisecting the apex angle 26 of the central body 14 and extending along the length of the central body 14 from the apex 20 to the rear end of the blade 10. A first impeller 28 is located to one lateral side of the swivel axis 24 and projects from one planar surface 30 of the central body 14 proximate one base corner of the triangular central body 14 at the rear end of the blade 10, and a second impeller 32 is located to the other lateral side of the swivel axis 24 and projects from the other planar surface 34 of the central body 14 proximate the other base corner of the triangular central body 14 at the rear end of the blade 10. As can be best seen in FIGS. 1, 2, and 3, the second impeller 32 is offset from the first impeller 28 in the longitudinal direction of the swivel axis 24. That is, the second impeller 32 is located further to the rear end of the blade 10 than is the first impeller 28. As can be seen in FIGS. 3 and 4, the length "L-1" of the first impeller 28 from the base of the first impeller at the one planar surface 30 to the tip of the first impeller 28 is substantially equal to the length "L-2" of the second impeller 32 at the other planar surface 34 to the tip of the second impeller 32. Preferably, the first impeller 28 is of substantially the same surface frontal area as is the second impeller 32. As can be best seen in FIGS. 1 and 2, in plane view the front surface 36 of the first impeller 28 is substantially at a right angle to the side edge 16 of the triangular central body 14 and the front surface 38 of the second impeller 32 is substantially at a right angle to the other side edge 18 of the triangular central body 14. Therefore, the front surface 36 of the first impeller 28 is disposed at an acute angle to the swivel axis 24 and the front surface 38 of the second impeller 32 is disposed at an equal acute angle to the swivel axis 24.

With continued reference to FIGS. 2, 3 and 4, the swivel mounting means 22 comprises a front bearing 40 at the apex 20 of the front end of the blade 10 and a rear bearing 42 at the rear end of the blade 10 centrally located laterally between the first impeller 28 and second impeller 32 and in mutual alignment on the swivel axis 24. As shown, the front bearing 40 is a downwardly bent flange having an aperture therethrough, and the rear bearing 40 is a downwardly bent flange having an aperture therethrough. The apertures in the flanges of the front and rear bearings 40 and 42 are in coaxial alignment on the swivel axis 24.

Figure 5:
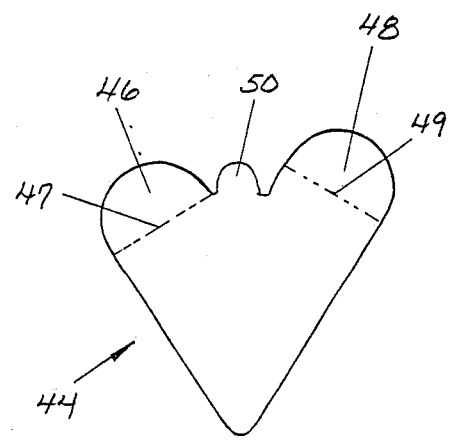
FIG. 5 is a plan view of a blank from which the blade of FIGS. 1-4 is made.

With reference to FIG. 5, the blade 10 can be fabricated from a blank 44 of a rigid or stiff material, such as a metal, having a generally heart shaped peripheral configuration having two lobes 46 and 48 of unequal size located to opposite lateral sides of the longitudinal centerline of the heart shaped blank 44. The area between the lobes 46 and 48 is formed with a projecting tongue 50. To form the blade 10, one of the lobes, for example the smaller lobe 46 is bent generally perpendicular to one flat side of the blank 44 along an imaginary fold line 47 at a right angle to one diverging edge of the blank 44 to form the first impeller 28, and the larger lobe 48 is bent generally perpendicular so the other flat side of the blank 44 along an imaginary fold line 49 at the right angle to the other diverging edge of the blank 44 to form the second impeller 32. The apex of the heart shaped blank 44 is bent generally perpendicular to one flat side of the blank 44 to form the flange of the front bearing 0 and the tongue 50 is bent generally perpendicular to the same flat side of the blank 44 to form the flange of the rear bearing 42.

With reference to FIGS. 6 through 10, the fish lure 12 will be described as comprising two blades 10A and 10B. The blades 10A and 10B of the fish lure 12 are identical to each other and to the blade 10 of FIGS. 1 through 4 and, therefore, the same numerals identifying the elements of the blade 10 are used with suffixes A and B throughout FIGS. 5-9 without repeating the description thereof. The first blade 10A is substantially identical to the second blade 10B in size and configuration.

The first blade 10A and second blade 10B are disposed in mutual overlaying, spaced apart, mirror image relationship with the swivel axis 24 of the first blade 10A coinciding with the swivel axis 24 of the second blade 10B. The first impeller 28 of the first blade 10A and the second impeller 32 of the second blade 10B are in mutual overlaying relationship and spaced apart from each other in the longitudinal direction of the swivel axis 24. Likewise, the second impeller 32 of the first blade 10A and the first impeller 28 of the second blade 10B are in mutual overlaying relationship and spaced apart from each other in the longitudinal direction of the swivel axis 24.

An axle 52 interconnects the swivel mounting means 22 of the first blade 10A and the swivel mounting means 22 of the second blade 10B, respectively, are free to swivel about the swivel axle 52. As shown, the swivel axle 52 is an extension of a fish hook 54 which includes an eye 56 for attaching the lure 12 to a fish line. The axle 52 projects through the apertures in the front bearing means 40 and rear bearing means 42 with the distal end of the axle 52 projecting outwardly from the rear bearing 42 to the rear end 21 of the blades 10A and 10B. A small collar 58, such as a rivet is coaxially located over the projecting distal end of the axle 52 adjacent the flanges of the rear bearing means 42, and the projecting distal end of the axle 52 is bent at 90 degrees to retain the collar 58 and, therefore, the blades 10A and 10B on the axle 52. As the lure 12 moves on the water, the blades 10A and 10B are allowed to swivel about the axle 52 and allowed to move along the longitudinal axis of the axle 52 toward and against the collar 58. Thusly, the blades 10A and 10B coact with each other, and with the collar 58 generating a clicking noise as the lure is moved in the water.

With continued reference to FIGS. 6 through 10, the offset or staggered first and second impellers 28 and 32, respectively, provide for a space between the first impeller 28 of the first blade 10A and second impeller 32 of the second blade 10B longitudinally of the swivel axis 24, and a space between the second impeller 32 of the first blade 10A and first impeller 28 of the second blade 10B longitudinally of the swivel axis 24 regardless of the orientation of the first and second blades 10A and 10B relative to each other about the swivel axle 52. As the first blade 10A and second blade 10B swivel about the swivel axle 52 as the fish lure 12 is pulled through the water the first impeller 28 of the first blade 10A will not contact the second impeller 32 of the second blade 10B, and the second impeller 32 of the first blade 10A will not contact the first impeller 28 of the second blade 10B. Therefore, the first and second impellers 28 and 32 of the first and second blades 10A and 10B will not interfere with each other and will not interfere with the swivel movement of the first and second blades 10A and 10B.

The foregoing detailed description is given primarily for clearness of understanding of the invention and no unnecessary limitations are to be understood therefrom for modifications will become obvious to those skilled in the art upon reading this disclosure and may be made without departing from the spirit of the invention and scope of the appended claims.

I claim:

1. A fish lure comprising:

(a) a first blade comprising:

a generally planar central body generally triangular in peripheral configuration having a first side edge and second side edge diverging in a rearward direction of the central body from the apex at the front end of the central body;

swivel mounting means defining a swivel axis of the blade bisecting the apex angle and extending along the length of the central body from the apex at the front end of the blade to the rear end of the blade;

a first impeller projecting outwardly from one planar surface of the central body at the rear end of the triangular central body proximate the one base corner of the triangular central body;

a second impeller projecting outwardly from the other planar surface of the central body at the rear end of the triangular central body proximate the other base corner of the triangular center body; and, the second impeller is offset from the first impeller in the longitudinal direction of the swivel axis;

(b) a second blade comprising:

a generally planar central body generally triangular in peripheral configuration having a first side edge and a second side edge diverging in a rearward direction of the central body from the apex at the front end of the central body;

swivel mounting means defining a swivel axis of the blade bisecting the apex angle and extending along the length of the central body from the apex at the front end of the blade to the rear end of the blade;

a first impeller projecting outwardly from one planar surface of the central body at the rear end of the triangular central body proximate one base corner of the triangular central body;

a second impeller projecting outwardly from the other planar surface of the central body at the rear end of the triangular central body proximate the other base corner of the triangular central body; and, the second impeller is offset from the first impeller in the longitudinal direction of the swivel axis;

(c) the first and second blades are disposed in mutual overlaying spaced apart, mirror image relationship with their swivel axes coinciding, the first impeller of the first blade and second impeller of the second blade in mutual overlaying spaced apart relationship, and the second impeller of the first blade and first impeller of the second blade in mutual overlaying spaced apart relationship; and, (d) a common swivel axle interconnecting the swivel mounting means of the first blade and swivel mounting means of the second blade such that the first and second blades are free to swivel about the swivel axle.

2. The fish lure of claim 1, wherein:

the first impeller of the first blade and the second impeller of the second blade are spaced apart from each other in the longitudinal direction of the swivel axis regardless of the orientation of the first and second blades relative to each other about the swivel axis; and, the second impeller of the first blade and the first impeller of the second blade are spaced apart from each other in the longitudinal direction of the swivel axis regardless of the orientation of the first and second blades relative to each other about the swivel axis.

* * * * *